US012652194B2

(12) United States Patent
Muralidhara et al.

(10) Patent No.:  US 12,652,194 B2
(45) Date of Patent:       Jun. 9, 2026

(54) EFFICIENT LEARNING ALGORITHM FOR CHANNEL ESTIMATION IN WIRELESS COMMUNICATION SYSTEMS

(71) Applicant: Rakuten Symphony, Inc., Tokyo (JP)

(72) Inventors: Venkatesh Hampasandra Muralidhara, Bangalore (IN); Sri Venkata Gautham Thasari, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 331 days.

(21) Appl. No.: 18/032,019

(22) PCT Filed: Nov. 14, 2022

(86) PCT No.: PCT/US2022/049769
§ 371 (c)(1),
(2) Date: Apr. 14, 2023

(87) PCT Pub. No.: WO2024/107166
PCT Pub. Date: May 23, 2024

(65) Prior Publication Data
US 2024/0372750 A1       Nov. 7, 2024

(51) Int. Cl.
*H04L 25/02*           (2006.01)
*H04L 25/06*           (2006.01)
(Continued)

(52) U.S. Cl.
CPC ...... *H04L 25/0224* (2013.01); *H04L 25/0212* (2013.01); *H04L 25/067* (2013.01); *H04W 52/16* (2013.01); *H04W 52/362* (2013.01)

(58) Field of Classification Search
CPC ............. H04L 25/0224; H04L 25/0212; H04L 25/067; H04W 52/16; H04W 52/362
(Continued)

(56) References Cited

U.S. PATENT DOCUMENTS

2011/0299487 A1* 12/2011 Ito ........................ H04B 7/2606
                                                              370/329
2014/0064335 A1*  3/2014 Breun ................. H04W 52/325
                                                              375/136
(Continued)

OTHER PUBLICATIONS

International Search Report and Written Opinion of the International Searching Authority issued by the United States Patent and Trademark Office for corresponding International Patent Application No. PCT/US22/49769, electronically delivered on Mar. 7, 2023.

*Primary Examiner* — Kevin M Burd
(74) *Attorney, Agent, or Firm* — Myers Wolin, LLC

(57) ABSTRACT

A method of estimating a wireless channel including determining a value of β from a finite set of discrete values for channel estimation in a slot N based on time-selectivity of a channel corresponding to the slot N; estimating the channel according to reference signal symbols received in the slot N; determining a transmit power level in a slot N−1, a transmit power level in the slot N, and a power offset ratio; identifying filtered channel coefficients in the slot N−1; and computing in real time filtered channel coefficients in the slot N according to a determined set of values β applied to generate a subset of equalized QAM symbols in the slot N, the estimated channel according to reference signal symbols received in the slot N, the determined power offset ratio, and the filtered channel coefficients in the slot N−1.

20 Claims, 1 Drawing Sheet

(51) Int. Cl.
    *H04W 52/16*       (2009.01)
    *H04W 52/36*       (2009.01)

(58) Field of Classification Search
    USPC ......................................................... 375/262
    See application file for complete search history.

(56)               References Cited

U.S. PATENT DOCUMENTS

| | | |
|---|---|---|
| 2015/0304076 A1 | 10/2015 | Lee et al. |
| 2016/0337105 A1 | 11/2016 | Lawton et al. |
| 2017/0141936 A1 | 5/2017 | Lee |
| 2019/0190552 A1 | 6/2019 | Sagi et al. |
| 2021/0321385 A1 | 10/2021 | Lee et al. |

* cited by examiner

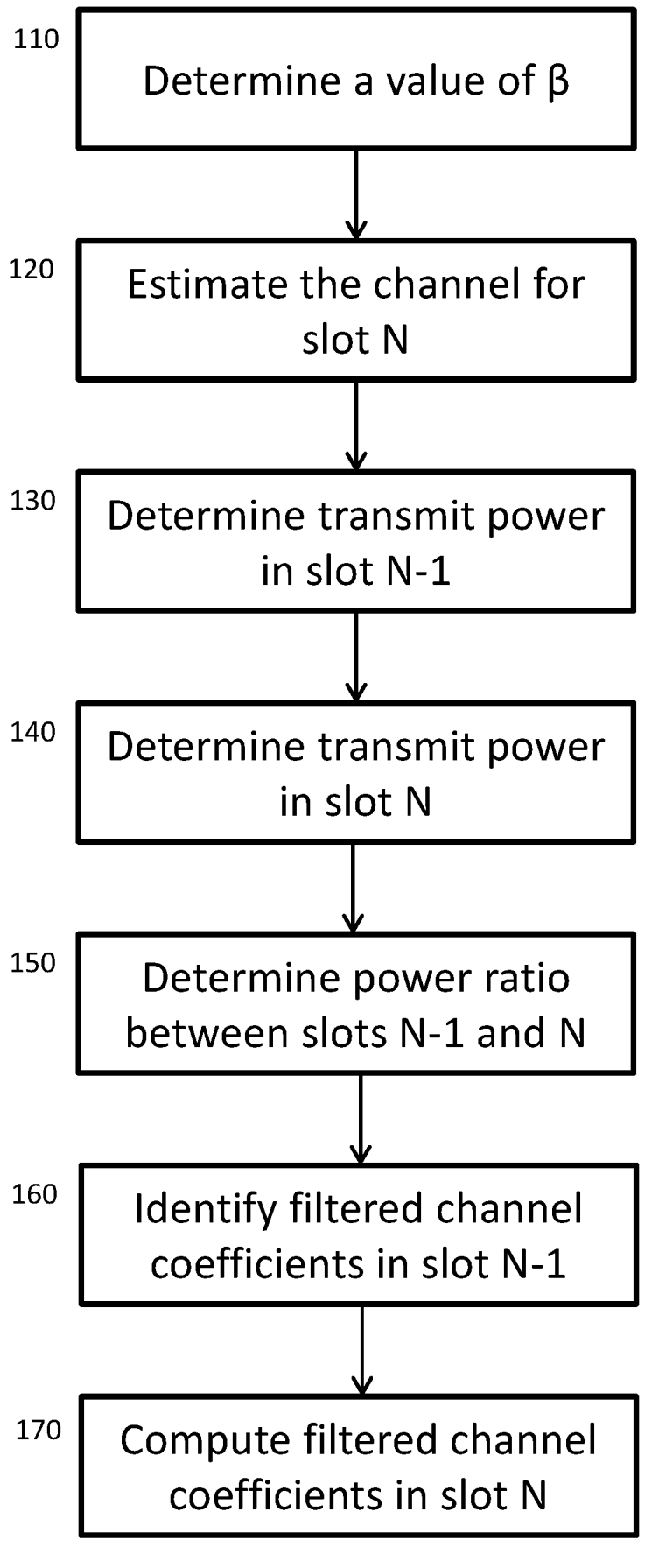
110 Determine a value of β
120 Estimate the channel for slot N
130 Determine transmit power in slot N-1
140 Determine transmit power in slot N
150 Determine power ratio between slots N-1 and N
160 Identify filtered channel coefficients in slot N-1
170 Compute filtered channel coefficients in slot N

EFFICIENT LEARNING ALGORITHM FOR CHANNEL ESTIMATION IN WIRELESS COMMUNICATION SYSTEMS

CROSS-REFERENCE TO RELATED APPLICATION

This application is a national stage application of International Application No. PCT/US2022/049769, filed on Nov. 14, 2022, and designated the U.S., the entire contents of which are herein wholly incorporated by reference.

TECHNICAL FIELD

In some example embodiments, the subject matter herein generally relates to wireless communication systems, and more specifically to an efficient learning algorithm for channel estimation in wireless communication systems.

BACKGROUND

Modern day wireless communication systems conforming to standards like 5G New Radio (NR) transmit and receive signals in units of time called slots. Each transmitted slot of signal travels through a wireless propagation channel before reaching the receiver. The effects of channel depend on environmental topography as well as the relative velocity of the receiver with respect to transmitter.

Each slot of signal received at the receiver is independently equalized to compensate for the effects of channel. As the channel is estimated independently on each slot, traditional signal processing algorithms fail to utilize the information that the receiver already has about the channel in past slots. That makes the estimated channel noisy and the solution thus built does not perform to the full potential, resulting in drop in throughput in the low signal to noise (SNR) region.

The primary reason for avoiding the usage of knowledge of the channel over past slots is the possibility of time selective or time varying channels. Depending on the relative velocity and the consequent Doppler spread the channel behavior can vary with time and it becomes extremely difficult to gauge the extent to which information of the channel over past slots can be reliably used as an input to estimate the channel in a given slot. Thus, current channel estimation methods generally do not make use of the knowledge of the channel over past slots.

However, even when the channel is time selective, it is mainly the phase of the complex channel coefficients that vary across slots. The power delay profile would remain unchanged at least over a few tens of milliseconds. So irrespective of the channel conditions there is useful information in the channel over past slots that can be used to improve the channel estimate in a given slot. Thus, there is a need for an enhancement of channel estimation by making use of receiver's knowledge of channel in past slots without increasing the real-time processing requirements.

SUMMARY

In one general aspect, a method of estimating a wireless channel is provided. The method includes determining a value of β from a finite set of discrete values ranging from 0 to 1 to be used for channel estimation in a slot number N based on time-selectivity of a channel corresponding to the slot number N; estimating the channel according to reference signal symbols received in the slot number N; determining a transmit power level in a slot number N−1; determine a transmit power level in the slot number N; determining a power offset ratio of the transmit power in the slot number N−1 to the transmit power in the slot number N; identifying filtered channel coefficients in the slot number N−1; and computing in real time filtered channel coefficients in the slot number N according to a determined set of values β applied to generate a subset of equalized QAM symbols in the slot number N, the estimated channel according to reference signal symbols received in the slot number N, the determined power offset ratio, and the filtered channel coefficients in the slot number N−1.

Implementations of the method may include one or more of the following features. In the method, a value of 1 indicates reliance on a previous channel estimation and a value of 0 indicates reliance on current channel estimation, according to an embodiment. Further in the method, computing in real time filtered channel coefficients in the slot number N includes equalizing a subset of complex QAM symbols with each value in the set of values for β, according to an embodiment.

In another general aspect, a wireless channel estimating apparatus is provided. The wireless channel estimating apparatus includes a memory configured to store a plurality of instructions; processor circuitry coupled to the memory and configured to execute the plurality of instructions to determine a value of β from a finite set of discrete values ranging from 0 to 1 to be used for channel estimation in a slot number N based on time-selectivity of a channel corresponding to the slot number N; estimate the channel according to reference signal symbols received in the slot number N; determine a transmit power level in a slot number N−1; determine a transmit power level in the slot number N; determine a power offset ratio according to the ratio of transmit power level in the slot number N−1 to the transmit power of the slot number N; identify filtered channel coefficients in the slot number N−1; and compute in real time filtered channel coefficients in the slot number N according to a determined set of values β applied to generate a subset of equalized QAM symbols in the slot number N, the estimated channel according to reference signal symbols received in the slot number N, the determined power offset, and the filtered coefficients in the slot number N−1.

Implementations of the wireless channel estimating apparatus may include one or more of the following features. In the wireless channel estimating apparatus, β is a momentum term and depends on the time selectivity of the channel, and wherein an optimum value of β depends of the time selectivity of the channel, according to an embodiment. In a further embodiment, a value of 1 indicates reliance on a previous channel estimation and a value of 0 indicates reliance on current channel estimation. In a further embodiment, computing filtered channel coefficients in real time in the slot number N includes equalizing a subset of complex QAM symbols with each value in the set of values for β, and in a further embodiment the value of β that produces the highest mean value of absolute Log-Likelihood Ratio (LLR) of demodulated QAM symbols is chosen as the best value of β for slot number N. In a further embodiment, the real time filtered channel coefficients in the slot number N are computed using the best value of β from the set of values β for equalization of all the complex QAM symbols allocated. In a further embodiment, a subset of complex QAM symbols is randomly chosen over an entire bandwidth. In a further embodiment, a cardinality of the subset of QAM symbols is much smaller than a total number of QAM symbols allocated. In a further embodiment, the processor circuitry iteratively equalizes all the complex QAM symbols estimated using each value of β from the finite set of discrete values in attempting to decode a payload for every iteration.

In another general aspect, a wireless channel estimating system is provided. The wireless channel estimating system includes a transmitter configured to transmit at least one reference signal and a plurality of Quadrature Amplitude Modulated (QAM) data symbols; a receiver configured to receive the at least one reference signal and the plurality of QAM data symbols; determine a value of β from a finite set of discrete values ranging from 0 to 1 to be used for channel estimation in a slot number N based on time-selectivity of a channel corresponding to the slot number N; estimate the channel according to the at least one reference signal symbols received the slot number N; determine a transmit power level in a slot number N−1; determine a transmit power level in the slot number N; determine a power offset ratio between the slot number N−1 and slot number N; identify filtered channel coefficients in the slot number N−1; and compute in real time filtered channel coefficients for the slot number N.

Implementations of the wireless channel estimating system may include one or more of the following features. In the wireless channel estimating system, the real time filtered channel coefficients are computed according to the following equation according to an embodiment:

$$H_{filtered}^{N} = \frac{\beta * H_{filtered}^{N-1}}{\sqrt{\text{Power Offset}}} + (1 - \beta) * H_{estimated}^{N}$$

where N is the slot number; β is the momentum of a propagation channel comprising the slot N;

$$H_{filtered}^{N}$$

is a vector of the filtered channel estimate in the slot N;

$$H_{estimated}^{N}$$

is a channel estimated using only the QAM symbols of the at least one reference signal received in slot N;

$$H_{filtered}^{N-1}$$

is a vector of the filtered channel estimate in slot N−1; and Power Offset is the ratio of the transmit power in slot N−1 to the transmit power in slot number N. In a further embodiment, a set of values for β are determined according to the time selectivity of the channel, and wherein a value of 1 indicates reliance on a previous channel estimation and a value of 0 indicates reliance on a current channel estimation. In a further embodiment, computing filtered channel coefficients in real time in the slot number N includes equalizing a subset of complex QAM symbols with each value in the set of values for β. In a further embodiment, the value of β that produces the highest mean value of absolute Log-Likelihood Ratio (LLR) of demodulated QAM symbols is chosen as the best value of β for slot N. In a further embodiment, the real time filtered channel coefficients in the slot number N are computed using the best value of β from the set of values β for equalization of all the complex QAM symbols allocated. In a further embodiment, a subset of complex QAM symbols is randomly chosen over an entire bandwidth, and wherein a cardinality of the subset of QAM symbols is much smaller than a total number of QAM symbols allocated. In a further embodiment, the receiver is configured to iteratively equalize all the complex QAM symbols estimated using each value of β from the finite set of discrete values in attempting to decode a payload for every iteration.

BRIEF DESCRIPTION OF THE DRAWINGS

FIG. 1 illustrates a process of estimating a wireless channel according to an embodiment.

DETAILED DESCRIPTION

In channel estimation, one of the most promising ideas is to use neural networks and allow them to adapt the weights for past and the present inputs dynamically. There is a lot of study that is ongoing in this regard and excellent improvements in performance have already been reported and published (see, for example, Refs. [1]-[3]). However, computing weights of a neural network in every slot is an extremely costly operation in the current generation of processors that host baseband signal processing operations.

An embodiment of the present invention proposes an efficient and yet low-cost alternative as described below.

FIG. 1 shows a process flow for estimating a wireless channel according to an embodiment.

In 110, a value β is determined from a finite set of discrete values ($0 \leq \beta \leq 1$) that is to be used for channel estimation in a slot number N based on time-selectivity of a channel corresponding to the slot number N. Here, β is known as the momentum of the propagation channel.

In 120, the channel is estimated according to reference signal symbols received in the slot number N. This gives the current $$H_{estimated}^{N},$$

which is a channel instantaneously estimated using only the QAM symbols of the at least one reference signal received in slot N.

In 130, a transmit power level in a slot number N−1 is determined, and in 140 a transmit power level in the slot number N is determined. Using the determined power levels in 130 and 140, a power offset ratio between the slot number N−1 and slot number N is determined in 150.

Useful information in the channel over past slot N−1 can be used to improve the channel estimate in the present slot N. In 160, filtered channel coefficients in the slot number N−1 are identified. Here, $$H_{filtered}^{N-1}$$

is a vector of the filtered channel estimate in slot N−1.

In 170, filtered channel coefficients in the slot number N are computed in real time. Here, $$H_{filtered}^{N}$$

is a vector of the filtered channel estimate in the slot N, which is computed in real time based on a determined set of values β applied to generate a subset of equalized QAM symbols in the slot number N, the estimated channel according to reference signal symbols received in the slot number N, the determined power offset, and the filtered coefficients in the slot number N−1.

In one embodiment, the real time filtered channel coefficients are computed according to the following equation:

$$H^N_{filtered} = \frac{\beta * H^{N-1}_{filtered}}{\sqrt{\text{Power Offset}}} + (1 - \beta) * H^N_{estimated} \qquad (\text{Eq. 1})$$

where N is the slot number; β is the momentum of a propagation channel comprising the slot N;

$$H^N_{filtered}$$

is a vector of the filtered channel estimate in the slot N;

$$H^N_{estimated}$$

is a channel estimated using only the QAM symbols of the at least one reference signal received in slot N;

$$H^{N-1}_{filtered}$$

is a vector of the filtered channel estimate in slot N−1; and Power Offset is the ratio of the transmit power in slot N−1 to the transmit power in slot number N.

As can be seen from the right hand side of Eq. 1, when β=1, the second term goes to zero, indicating that the filtered channel estimate in the slot N relies solely on the filtered channel estimate in the slot N−1; whereas when β=0, the first term goes to zero, indicating that the filtered channel estimate in the slot N relies solely on the instantaneous channel estimate in the slot N.

Note that the right value for β depends on the time selectivity of the channel, and $$H^N_{filtered}$$

is estimated for a set of values of β, according to an embodiment. In one embodiment, a subset of complex QAM symbols is equalized using channel estimated with each value of β, according to an embodiment. According to an embodiment, the value of β that gives the highest mean of absolute Log-Likelihood Ratio (LLR) values post demodulation of QAM symbols is chosen as the best value for the given slot. In one embodiment, the best value of β for a specific resource block is also identified to be the best value for the entire allocated bandwidth for transmission in a slot as β depends only on the relative velocity. This property of β enables the subset of complex QAM symbols used for β determination to be chosen randomly over the entire allocated bandwidth. In one embodiment, cardinality of this subset of QAM symbols can be chosen to be much smaller than the total number of QAM symbols in the allocation and depends on the allocation size as well as affordable million instructions per second (MIPS) for β determination.

Depending upon the available physical cores in the system, a superior solution is to iteratively equalize all the complex QAM symbols with channel estimated using every value in the finite set of discrete values for β and attempt to decode the payload in every iteration, according to an embodiment.

It is observed in simulations that an embodiment of the present invention gives significant increase in the performance of the receiver when the received signal is weak as it is the case typically for Cell edge users. Note that efficiency of the proposed channel estimation algorithms and the associated performance are close to that of neural networks-based learning algorithms. An embodiment also does so without significantly increasing the MIPS requirement of the traditional channel estimation algorithms. Thus, embodiments of the present invention provide unique advantages over existing methods and systems.

Other variations to the disclosed embodiments can be understood and effected by those skilled in the art in practicing the claimed features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like acquiring, accessing, analyzing, capturing, comparing, determining, displaying, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

REFERENCES

Ref [1]: H. Ye, G. Y. Li and B.-H. Juang, "Power of deep learning for channel estimation and signal detection in OFDM systems," IEEE Wireless Communications Letters (Volume: 7, Issue: 1, February 2018)

Ref [2]: Xuemei Yi and Caijun Zhong, "Deep Learning for Joint Channel Estimation and Signal Detection in OFDM Systems", IEEE Communications Letters (Volume: 24, Issue: 12, December 2020)

Ref [3]: David Neumann; Thomas Wiese; Wolfgang Utschick, "Learning the MMSE Channel Estimator", IEEE Transactions on Signal Processing (Volume: 66, Issue: 11, Jun. 1, 2018)

The invention claimed is:

1. A method of improving a throughput of a wireless communication system by estimating a wireless channel for the wireless communication system to equalize slots of the wireless channel to compensate channel effects, the method comprising:

determining a value of β from a finite set of discrete values ranging from 0 to 1 to be used for channel estimation in a slot number N based on time-selectivity of a channel corresponding to the slot number N;

estimating the channel according to reference signal symbols received in the slot number N;

determining a transmit power level in a slot number N−1;

determine a transmit power level in the slot number N;

determining a power offset ratio of the transmit power in the slot number N−1 to the transmit power in the slot number N;

identifying filtered channel coefficients in the slot number N−1;

computing in real time, by the wireless communication system, filtered channel coefficients in the slot number N according to a determined set of values β applied to generate a subset of equalized Quadrature Amplitude Modulated (QAM) symbols in the slot number N, the estimated channel according to reference signal symbols received in the slot number N, the determined power offset ratio, and the filtered channel coefficients in the slot number N−1; and decoding a payload for every iteration based on the equalized QAM symbols.

2. The method according to claim 1, wherein a β value of 1 indicates reliance on a previous channel estimation and a β value of 0 indicates reliance on current channel estimation.

3. The method according to claim 2, wherein computing in real time filtered channel coefficients in the slot number N comprises equalizing a subset of complex QAM symbols with each value in the set of values for β.

4. A wireless channel estimating apparatus in a wireless communication system, for improving a throughput of the wireless communication system by estimating a wireless channel for the wireless communication system to equalize slots of the wireless channel to compensate channel effects, the apparatus comprising:

a memory configured to store a plurality of instructions;

processor circuitry coupled to the memory and configured to execute the plurality of instructions to:

determine a value of β from a finite set of discrete values ranging from 0 to 1 to be used for channel estimation in a slot number N based on time-selectivity of a channel corresponding to the slot number N;

estimate the channel according to reference signal symbols received in the slot number N;

determine a transmit power level in a slot number N−1;

determine a transmit power level in the slot number N;

determine a power offset ratio according to the ratio of transmit power level in the slot number N−1 to the transmit power of the slot number N;

identify filtered channel coefficients in the slot number N−1;

compute in real time filtered channel coefficients in the slot number N according to a determined set of values β applied to generate a subset of equalized Quadrature Amplitude Modulated (QAM) symbols in the slot number N, the estimated channel according to reference signal symbols received in the slot number N, the determined power offset, and the filtered coefficients in the slot number N−1; and decoding a payload for every iteration based on the equalized QAM symbols.

5. The wireless channel estimating apparatus according to claim 4, wherein β is a momentum term and depends on the time selectivity of the channel, and wherein an optimum value of @ depends on the time selectivity of the channel.

6. The wireless channel estimating apparatus according to claim 5, wherein a β value of 1 indicates reliance on a previous channel estimation and a β value of 0 indicates reliance on current channel estimation.

7. The wireless channel estimating apparatus according to claim 6, wherein computing filtered channel coefficients in real time in the slot number N comprises equalizing a subset of complex QAM symbols with each value in the set of values for β.

8. The wireless channel estimating apparatus according to claim 7, the processor circuitry is further configured to execute the plurality of instructions to iteratively equalize all the complex QAM symbols estimated using each value of β from the set of values β in attempting to decode a payload for every iteration.

9. The wireless channel estimating apparatus according to claim 7, wherein the value of β that produces the highest mean value of absolute Log-Likelihood Ratio (LLR) of demodulated QAM symbols is chosen as the best value of β for slot number N.

10. The wireless channel estimating apparatus according to claim 9, wherein the real time filtered channel coefficients in the slot number N is computed using the best value of β from the set of values β for equalization of all the complex QAM symbols allocated.

11. The wireless channel estimating apparatus according to claim 10, wherein a subset of complex QAM symbols is randomly chosen over an entire bandwidth.

12. The wireless channel estimating apparatus according to claim 11, wherein a cardinality of the subset of QAM symbols is much smaller than a total number of QAM symbols allocated.

13. A wireless channel estimating system, in a wireless communication system, for improving a throughput of the wireless communication system by estimating a wireless channel for the wireless communication system to equalize slots of the wireless channel to compensate channel effects, the wireless channel estimating system comprising:

a transmitter configured to transmit at least one reference signal and a plurality of Quadrature Amplitude Modulated (QAM) data symbols:

a receiver configured to:

receive the at least one reference signal and the plurality of QAM data symbols;

determine a value of β from a finite set of discrete values ranging from 0 to 1 to be used for channel estimation in a slot number N based on time-selectivity of a channel corresponding to the slot number N;

estimate the channel according to the at least one reference signal symbols received in the slot number N;

determine a transmit power level in a slot number N−1;

determine a transmit power level in the slot number N;

determine a power offset ratio between the transmit power in slot number N−1 and the transmit power in slot number N;

identify filtered channel coefficients in the slot number N−1;

compute in real time filtered channel coefficients for the slot number N according to a determined set of values β applied to generate a subset of equalized QAM symbols in the slot number N, the estimated channel according to reference signal symbols received in the slot number N, the determined power offset, and the filtered coefficients in the slot number N−1; and decoding a payload for every iteration based on the equalized QAM symbols.

14. The wireless channel estimating system according to claim 13, wherein the real time filtered channel coefficients are computed according to the following equation:

$$H_{filtered}^{N} = \frac{\beta * H_{filtered}^{N-1}}{\sqrt{\text{Power Offset}}} + (1 - \beta) * H_{estimated}^{N}$$

where N is the slot number;
β is the momentum of a propagation channel comprising the slot N;

$$H_{filtered}^{N}$$

is a vector of the filtered channel estimate in the slot N;

$$H_{estimated}^{N}$$

is a channel estimated using only the QAM symbols of the at least one reference signal received in slot N;

$$H_{filtered}^{N-1}$$

is a vector of the filtered channel estimate in slot N−1; and Power Offset is the ratio of the transmit power in slot N−1 to the transmit power in slot number N.

15. The wireless channel estimating system according to claim 14, wherein a set of values for β are determined according to the time selectivity of the channel, and wherein a value of 1 indicates reliance on a previous channel estimation and a value of 0 indicates reliance on a current channel estimation.

16. The wireless channel estimating system according to claim 15, wherein computing filtered channel coefficients in real time in the slot number N comprises equalizing a subset of complex QAM symbols with each value in the set of values for β.

17. The wireless channel estimating system according to claim 16, the receiver is further configured to iteratively equalize all the complex QAM symbols estimated using each value of β from the finite set of discrete values in attempting to decode a payload for every iteration.

18. The wireless channel estimating system according to claim 16, wherein the value of β that produces the highest mean value of absolute Log-Likelihood Ratio (LLR) of demodulated QAM symbols is chosen as the best value of β for slot N.

19. The wireless channel estimating system according to claim 18, wherein the real time filtered channel coefficients in the slot number N are computed using the best value of β from the set of values β for equalization of all the complex QAM symbols allocated.

20. The wireless channel estimating system according to claim 18, wherein a subset of complex QAM symbols is randomly chosen over an entire bandwidth, and wherein a cardinality of the subset of QAM symbols is much smaller than a total number of QAM symbols allocated.

* * * * *